United States Patent [19]

Spencer

[11] 4,116,278
[45] Sep. 26, 1978

[54] HORSESHOE MANUFACTURE

[76] Inventor: Dudley W. C. Spencer, 619 Shipley Rd., Wilmington, Del. 19809

[21] Appl. No.: 762,394

[22] Filed: Jan. 26, 1977

Related U.S. Application Data

[63] Continuation-in-part of Ser. No. 673,371, Apr. 5, 1976, Pat. No. 4,036,302, which is a continuation-in-part of Ser. No. 614,766, Sep. 18, 1975, Pat. No. 4,013,126.

[51] Int. Cl.² ............................................... A01L 5/00
[52] U.S. Cl. ............................................ 168/4; 168/6; 168/19
[58] Field of Search .................... 168/4, 6, 12, 18, 19

[56] References Cited

U.S. PATENT DOCUMENTS

| 10,161 | 10/1853 | Sargent | 168/6 |
|---|---|---|---|
| 289,504 | 12/1883 | Crane | 168/19 |
| 1,302,675 | 5/1919 | Krawczyszyk | 168/19 |
| 1,452,317 | 4/1923 | Simon et al. | 168/18 |
| 3,519,079 | 7/1970 | Bieber | 168/4 |
| 3,603,402 | 9/1971 | McDonnell | 168/4 |

*Primary Examiner*—Hugh R. Chamblee
*Attorney, Agent, or Firm*—Connolly and Hutz

[57] ABSTRACT

A horseshoe includes a generally U-shaped body member having a planar upper surface and a pair of free ends. An upstanding projection is mounted on the upper surface at each free end for fitting in corresponding pockets in the horse's hoof. A band may also span the free ends of the horseshoe to restrain the outward spreading thereof.

16 Claims, 13 Drawing Figures

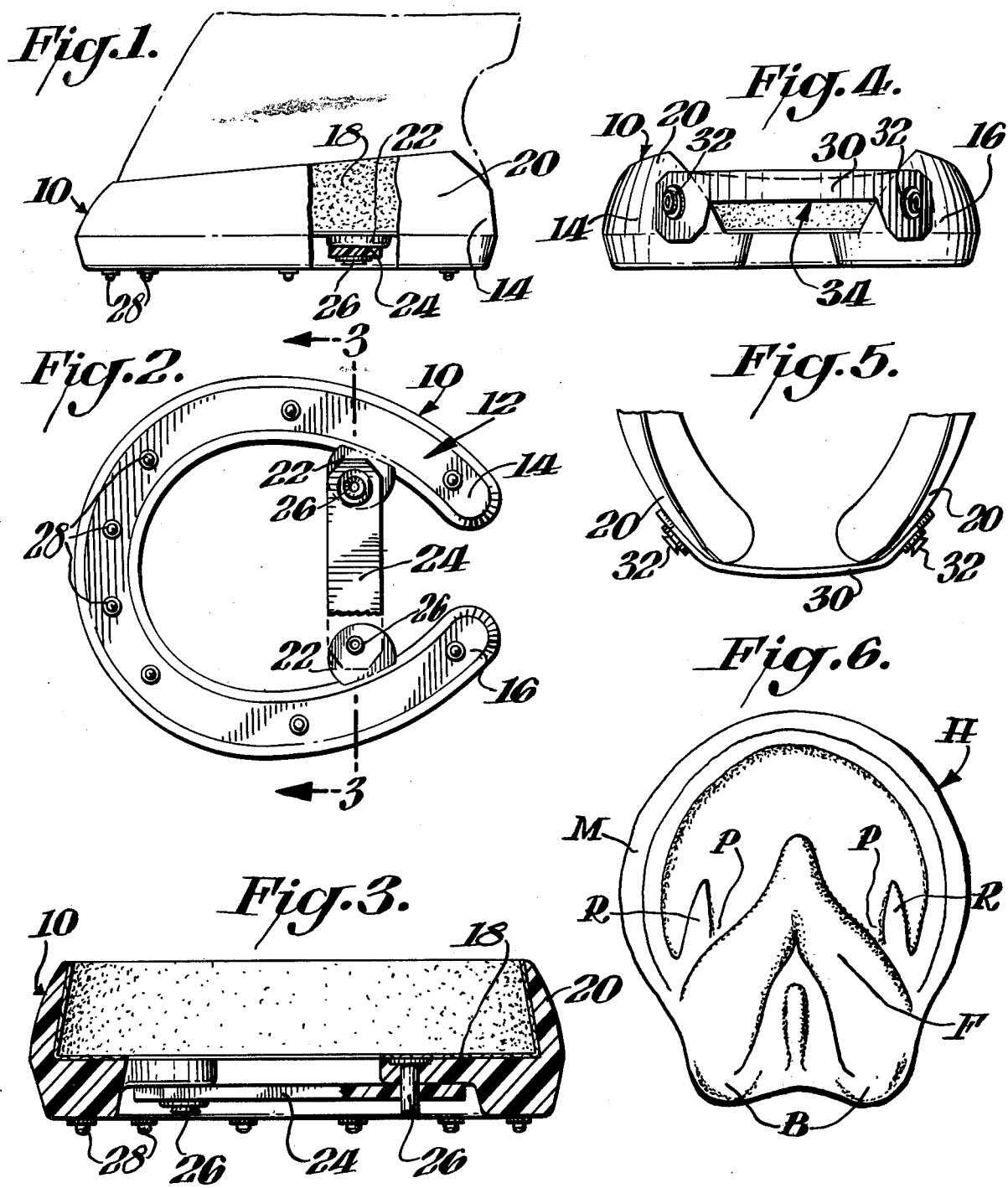

U.S. Patent  Sept. 26, 1978  Sheet 2 of 2  4,116,278
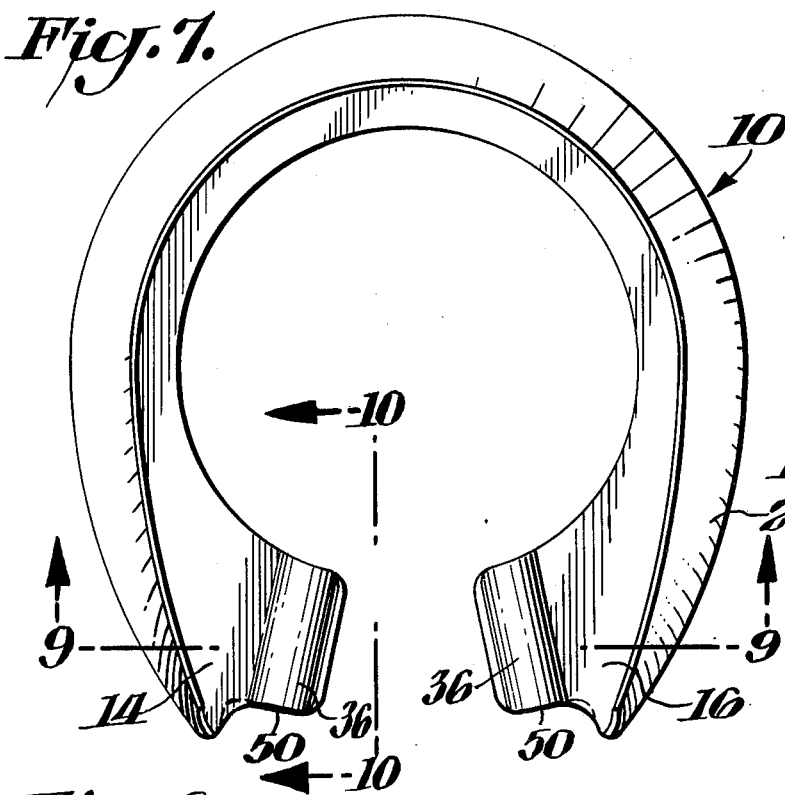
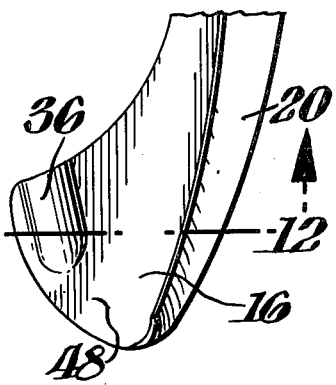
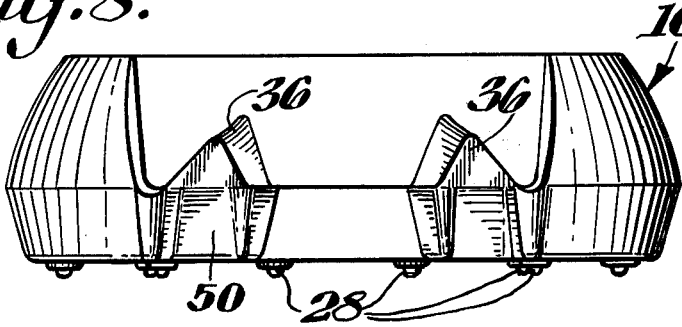
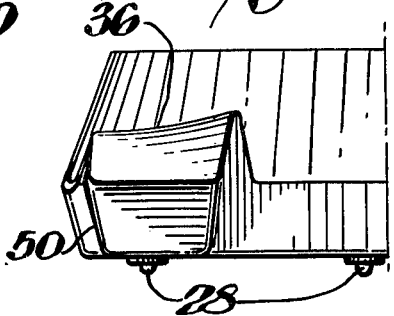
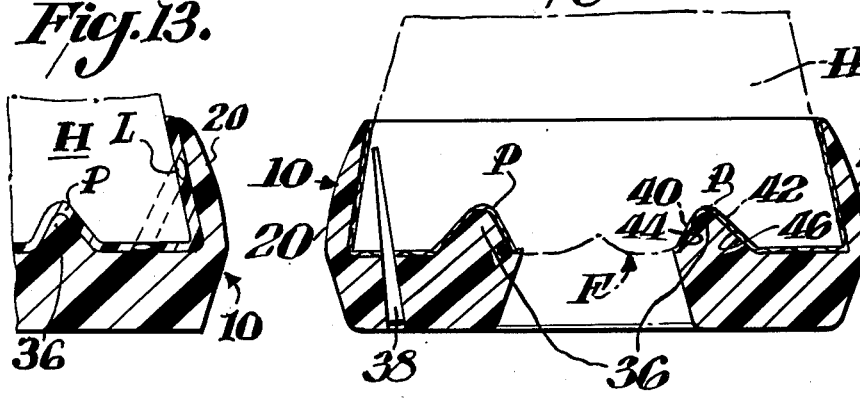
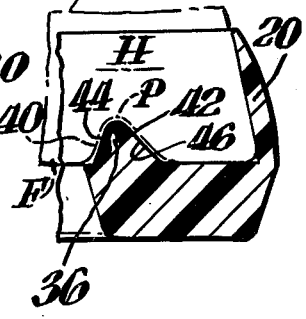

HORSESHOE MANUFACTURE

CROSS-REFERENCE TO RELATED APPLICATIONS

This application is a continuation-in-part of parent applications Ser. No. 673,371; filed Apr. 5, 1976, now U.S. Pat. No. 4,036,302, and Ser. No. 614,766; filed Sept. 18, 1975, now U.S. Pat. No. 4,013,126, which in turn are continuation-in-parts of my prior U.S. Pat. Nos. 3,917,000; 3,782,473 and 3,664,428.

BACKGROUND OF THE INVENTION

My aforenoted patents and applications relate to horseshoe techniques which generally include adhesively securing a plastic shoe member to the hoof. The present invention is based upon such techniques and is directed to advantageous ramifications thereof.

SUMMARY OF THE INVENTION

An object of this invention is to provide a horseshoe which incorporates means for facilitating the mounting thereof whether the actual securement is accomplished adhesively as with my prior techniques or by the more conventional nailing techniques.

A further object of this invention is to provide a horseshoe of the type described in my prior patents and applications wherein means are provided to restrain any tendency of the shoe to spread apart.

A still further object of this invention is to provide such a horseshoe which is particularly adapted for use with horses having weak or not fully developed feet such as young horses which require greater support.

In accordance with this invention the horseshoe incorporates projections on its upper surface for fitting into corresponding pockets in the horse's hoof to accurately locate the shoe with respect to the hoof and to enhance securement thus providing an effective supplement to other means of securement such as adhesive securement or nailing.

In a further embodiment of this invention the horseshoe is made in accordance with the techniques of my earlier patents and applications and the shoe is provided with lateral restraints to prevent the free ends of the shoe from spreading apart. Such shoe is particularly suitable to young horses having weak or not fully developed feet. In one practice of this embodiment the lateral restraint is accomplished by a horizontal band spanning the free ends of the shoe. In a further practice of this embodiment the band is vertically disposed and spans the upstanding peripheral wall at the free ends. With such vertical band a notch is provided to accommodate the bulb of the horse's frog.

THE DRAWINGS

FIG. 1 is a side elevation view partly in section of a horseshoe in accordance with one embodiment of this invention;

FIG. 2 is a bottom plan view of the horseshoe shown in FIG. 1;

FIG. 3 is a cross-sectional view taken through FIG. 2 along the line 3—3;

FIG. 4 is a rear elevation view of a horseshoe in accordance with a further embodiment of this invention;

FIG. 5 is a fragmental top plan view of a portion of the embodiment shown in FIG. 4;

FIG. 6 is a bottom plan view of a horse's hoof which is included for a better understanding of a still further embodiment of this invention;

FIG. 7 is a top plan view of the still further embodiment of this invention;

FIG. 8 is a rear elevation view of the horseshoe shown in FIG. 7;

FIGS. 9–10 are cross-sectional views in elevation taken through FIG. 7 along the lines 9—9 and 10—10, respectively;

FIG. 11 is a top plan view similar to FIG. 7 showing a portion of still yet another embodiment of this invention;

FIG. 12 is a cross-sectional view in elevation taken through FIG. 11 along the line 12—12; and FIG. 13 is a cross-sectional view in elevation similar to FIG. 12 showing a modified form of this invention.

DETAILED DESCRIPTION

My parent applications and patents Ser. No. 673,371, filed Apr. 5, 1976; Ser. No. 614,766, filed Sept. 18, 1975; U.S. Pat. No. 3,917,000; U.S. Pat. No. 3,782,473 and U.S. Pat. No. 3,664,428 describe earlier approaches I have taken which generally include adhesively securing a horseshoe made, for example, of a plastic material such as adiprene to the horse's hoof. The details of those earlier applications and patents are incorporated herein by reference thereof. The use of such plastic shoes represents a marked departure from the conventional practices taken by others in the art employing rigid metal horseshoes nailed to the hoof in that the shoes of my earlier practices have a certain degree of resiliency, flexibility or yieldability. While such shoes of my earlier practices accomplish the intended results there are certain circumstances when it would be desirable to limit the yieldability of such shoes while still retaining the advantages offered thereby. Such circumstances are, for example, when the shoes are used on horses having weak or not fully developed feet, such as young horses, since the tendency of the hoof would be to spread the free ends of the shoe apart. With such horses, however, it would be more desirable to restrain such tendency and thus provide greater support.

FIGS. 1–3 show one embodiment of this invention for accomplishing the above purposes wherein the benefits of my earlier practices are reaped and yet the shoe is adaptable for young horses. As illustrated in FIGS. 1–3 horseshoe 10 includes a generally U-shaped body member 12 terminating in a pair of free ends 14, 16 with body member 12 being made of a resilient material such as adiprene capable of being distorted out of its normal undistorted condition. Generally a liner 18 or barrier sheet is provided on the flat upper surface of shoe element 12 and along the inner surface of its inwardly inclined upwardly directed peripheral side wall 20.

As best shown in FIGS. 2–3 a pair of flanges 22 are provided on the inner periphery of free ends 14, 16 slightly inwardly or toward the bight thereof. A restraining band 24 is connected to flanges 22, 22. As later described in the preferred practice of this embodiment of this invention restraining band 24 is a narrow band spanning only a relatively small portion of the open space between the free ends 14, 16 and bight portion of the U-shaped member. Where desired, however, other shapes and sizes of restraining members may be used. For example, in my parent application I disclose providing a web member fitting such open space with the web member serving as a convenient medicament applicator.

Such web member would inherently also function as a lateral restraint.

In the embodiment illustrated in FIGS. 1-3, restraining band 24 is secured to flanges 22 by rivets 26. Other means of attachment may of course be used in place of such rivets. Preferably, adhesive is applied as described in my prior applications and patents wherein, for example, an adhesive material would be applied to the hoof and/or exposed upper surfaces of shoe 10 with the shoe then positioned on the inverted hoof. The shoe would have to be distorted or stretched to fit on the hoof. Band 24 is then pressed against rivets 26 to form marks or depressions on band 24 corresponding to the spacing of rivets 26. By use of a suitable implement such as a leather punch, holes are made in band 24 at the rivet marks. Band 24 is then snapped on rivets 26 and attached thereto.

Band 24 may be made of various materials and attached in various manners. For example, band 24 may have one preformed hole so that only the other hole need be formed in situ. Although band 24 is preferably of a plastic leather type material, it may also be of a rigid material such as metal although other hole forming means would be required.

Shoe 10 may take any suitable construction as of the types disclosed in my prior patents and applications including various secondary features such as the incorporation of metal gripping members or studs 28 on the lower surface thereof (FIG. 1-3).

FIGS. 4-5 illustrate a further embodiment of this invention wherein lateral restraint of the free ends 14, 16 is provided by a generally vertical band 30 rather than the horizontal band 24. In the embodiment illustrated in FIGS. 4-5 band 30 is secured to upstanding wall portion 20 by rivets 32 or other suitable fasteners. The shoe of this embodiment would be mounted on the hoof in the manner previously described with band 30 being pressed against the rivets after the shoe is mounted to make marks on the band. Corresponding holes are then made at the marks and band 30 is permanently secured by rivets 32.

As illustrated in FIG. 4 band 30 includes an elongated notch 34 intermediate its ends thereof to fit over and accommodate the bulb of the horse's frog. Since band 30 must bend to be fastened to the upstanding peripheral wall 20, it is preferred that band 30 be made of a material having some degree of flexibility otherwise band 30 would have to be molded with a curvature generally accommodating that of wall 20. In contrast horizontal band 24 is not required to have the same degree of flexibility of band 30 and horizontal band 24 made of a less flexible material although the same type of material is preferred.

FIGS. 7-11 illustrate another feature of this invention which may be used in addition to or separately from the prior embodiments incorporating the restraining band previously described. For a better understanding of this embodiment reference is first made to FIG. 6 which illustrates in bottom plan view the general configuration of a horse's hoof H. As indicated therein a rim of hard material M is disposed in a generally U-shape at the periphery of the hoof H. The frog F is located in the central area of the hoof with the bulb B being at the center thereof. At the end of the U-shaped hard material M further hard material or side bars R are provided on the hoof extending toward the frog. Between the bars R and the frog F are a pair of pockets P which extend upwardly similar to grooves, as also apparent from FIG. 9. The further embodiment of this invention makes use of this hoof anatomy to facilitate the mounting of the shoe on the hoof.

FIGS. 7-10 illustrate one form of this further embodiment. In the description of this embodiment, like reference numerals are used for like parts with respect to the previous embodiments and the main description will be directed to differences therefrom. As indicated therein each free end 14, 16 of the body member 12 is provided with an upstanding projection 36 shaped to fit into pockets P. The utilization of such projections 36 represents a significant advancement in the art and effectively prevents the shoe from being stripped from the hoof. The shoe itself can be secured in any desirable manner including by conventional means such as nails 38 (FIG. 9).

In one form of the invention projections 36 are wedged shaped and extend generally longitudinally completely across each free end 14, 16 as illustrated in FIG. 7. It is also preferable that the projections 36 closely conform to the internal configuration pockets P. As shown in FIG. 8 the top edge of each projection 36 is upwardly and inwardly inclined with a slight dip adjacent the outer edge similar to a saddle or cradle. It has been found that each pocket P includes an outer wall 42 (FIG. 9) which is generally at an angle of about 45° to the horizontal and an inner wall 40 which is at a steeper slope such as 60°-75°. Projections 36 accordingly include outer or inclined wall 46 which likewise is at an angle of about 45° and an inner or sloping wall 44 which is at the steeper angle of about 60°-75°. It is particularly significant that inclined wall 46 is at about 45° since a lateral component of force would thus be directed vertically due to the 45° angle which inherently results in maximum efficiency. Effective results can, however, also be obtained within certain variations. Thus, for example, inclined wall 46 may slope between 40°-50° while still attaining efficient results.

In use the farrier can trim the hoof or rasp the shoe to assure projections 36 properly fitting in pockets P and the shoe is then secured as by nailing or as by the aforenoted adhesive means.

Although it is preferable that projections 36 closely conform to the interior anatomy of pockets P the invention may be practiced broadly with a less conforming fit. Desirably inclined wall 46 would be at the angle of about 45°. The projections, however, need not extend completely across free ends 14, 16, as illustrated in FIGS. 11-12, and for example may simply be disposed on a portion of the free ends with flat areas 48 thereby resulting on the free ends. Although an inclined wall 46 is most desirable at about 45°, it is not as necessary that wall 44 closely conform to the slope of pocket P. Thus FIG. 12 illustrates wall 44 at a steeper angle approaching perpendicular. The broad concepts of this invention may also be practiced without wedge type projections but by having the projections take any suitable form such as being button shaped, diamond shaped, cylindrically shaped, etc. Thus although an inclined wall is preferred, it is not necessary to include such an inclined wall as long as the projection sufficiently enters pocket P.

It is also preferable to practice the invention by the incorporation of an adhesive on the upper surface of body member 12 and the inner surface of peripheral side wall 20 even where nails or other means of securement are used. In this regard the adhesive functions to seal the hoof from rock dust, etc. Thus in general this embodiment of the invention is practiced by using a shoe made of a yieldable or resilient material having upstanding projections for fitting in the pockets of the hoof. A liner with adhesive means may optionally be provided and the mounting may be adhesive or by more conventional means such as nailing.

As indicated hereafter, the various embodiments may be used in combination with the arrangements described in my prior patents. Thus, for example, FIG. 13 shows the combination of upstanding rim 20 and projections 36 in pockets P with lace material L adhesively secured to the body member 10. The lace is threaded through holes in the horse's hoof H and secured to the body member in a manner described in my earlier U.S. Pat. Nos. 3,917,000 and 4,013,126 and 4,036,302. The combination of the upstanding portion of rim 20 at each free end and the corresponding projection 36 inherently cooperate to prevent the shoe from being stripped from the hoof regardless of the direction of lateral force. Similarly, a force in a downward direction would inherently be resisted by the inclusion of lace material L.

In accordance with a further aspect of this invention the free ends 14, 16 are notched at their outer corners (FIG. 7) on shoes which are to be used on the front hoofs and the shoe is tapered inwardly from its upper surface downwardly as indicated by flats 50 to generally conform to the taper at the rear portion of the front hoof. This construction minimizes the possibility of any portion of the shoe projecting outwardly beyond the hoof. The advantage of such arrangement is to eliminate the danger of the back hoof striking such an outward projection which could otherwise result in stripping off the shoe or in causing the horse to trip.

As previously indicated the various embodiments described herein have utility severally or in combination and may likewise be utilized in combination with the arrangements described in my prior patents and applications as well as with conventional arrangements.

What is claimed is:

1. A horseshoe comprising a U-shaped body member terminating in a pair of free ends, said body member being made of resilient material capable of being distorted out of its normal undistorted condition, said body member having an outer edge and an inner edge with a generally planar upper surface therebetween, said upper surface being adapted to be adhesively secured to the hoof, an upstanding rim along said outer edge extending inwardly and upwardly toward said inner edge, an upstanding projection at said inner edge at each of said free ends opposite a portion of said rim, each of said projections extending upwardly above said planar surface for fitting in corresponding pockets in the hoof, each of said projections having an inner wall disposed remote from the portion of said rim on its free end and adjacent the space between said free ends, each of said projections having an outer wall between its inner wall and the portion of said rim on its free end, each of said outer walls being inclined from said planar surface upwardly and outwardly away from the portion of said rim at its free end, and said projections being connected to each other solely by their common mounting on said resilient body member whereby the spacing between said projections is determined by the location of the pockets in the hoof.

2. The horseshoe of claim 1 including a restraining band secured to and spanning said free ends for limiting the tendency of the hoof to spread.

3. The horseshoe of claim 2 including a tab secured to each of said free ends in said open space, and said band being attached to said tabs.

4. The horseshoe of claim 3 wherein said tabs are coplanar with said upper surface.

5. The horseshoe of claim 4 wherein said band is secured to said peripheral rim.

6. The horseshoe of claim 5 wherein said band includes a cut-out section for accommodating the bulb of the frog of the hoof.

7. The horseshoe of claim 1 including adhesive sealing means on said upper surface.

8. The horseshoe of claim 7 including a liner on said upper surface and on the inner surface of said rim.

9. The horseshoe of claim 1 including nails extending upwardly through said body member for securement thereof to the hoof.

10. The horseshoe of claim 1 wherein each of said projections is wedge shaped.

11. The horseshoe of claim 10 wherein each of said projections has an upwardly and inwardly inclined top wall.

12. The horseshoe of claim 10 wherein said outer wall is at an angle of about 40°–50°.

13. The horseshoe of claim 12 wherein said wall is at an angle of about 45° and said inner wall is at an angle of about 60°–75°.

14. The horseshoe of claim 1 wherein each of said free end is notched at its edge remote from the bight of said body member and said body member tapering downwardly and inwardly at the notches.

15. The horseshoe of claim 14 wherein said projections terminate at said notches.

16. The horseshoe of claim 1 including a lace for being threaded through holes in the hoof, and said lace being adhesively secured to said body member.

* * * * *